April 1, 1958  G. L. LUPFER  2,828,885
SAFETY GUARD FOR HIGH PRESSURE CYLINDERS
Filed May 19, 1955

INVENTOR.
GEORGE L. LUPFER
BY *Leland L Chapman*
ATTORNEY

United States Patent Office 2,828,885
Patented Apr. 1, 1958

2,828,885

SAFETY GUARD FOR HIGH PRESSURE CYLINDERS

George L. Lupfer, Maple Heights, Ohio, assignor to The Standard Oil Company, Cleveland, Ohio, a corporation of Ohio Application May 19, 1955, Serial No. 509,454

1 Claim. (Cl. 220—85)

The present invention relates to safety guards for high pressure cylinders. More particularly, the invention relates to a safety guard for the valve means of a high pressure cylinder.

High pressure cylinders are today widely used in commerce for the transportation and storage of a number of gases such as hydrogen, ammonia, oxygen, carbon dioxide, hydrogen sulfide, liquified petroleum gases and the like. Such cylinders are usually provided with a valve means at one end to permit the introduction and discharge of the particular gas which is to be contained in the cylinder. Because of the high pressure under which gases are contained in such cylinders, a considerable safety hazard is presented by the danger of a defect in or damage to the valve means. For example, if the valve means in a cylinder containing a gas under a high pressure should either become internally defective or be damaged by some external force so as to permit a sudden escape of the gas contained therein, the entire cylinder may behave like a rocket and be propelled a great distance with considerable velocity. Such occurrences are manifestly dangerous and a number of industrial accidents have been occasioned by just such happenings. Accordingly, it is the object of this inention to provide a safety guard for high pressure cylinders which will reduce the hazards normally associated with the handling and use of such cylinders.

The safety guard of this invention has at least two complementary functions, both of which contribute to the safer handling of high pressure cylinders. The first of these functions relates to the deflection of gas which may escape from the cylinder in the event that the valve means should become defective, either through an inherent defect or through some external cause. The reaction force, or thrust, exerted on the cylinder by a gas escaping therefrom is counteracted and substantially nullified by a force in the opposite direction caused by the impingement of the escaping gas on the safety guard. Hence, the propulsion of the cylinder by means of the escaping gas is effectively precluded. The safety guard of this invention, therefore, prevents the cylinder from behaving as a rocket in the event of sudden and unexpected release of the gas in the cylinder through the valve means.

The second function of the guard is to protect the valve means from damage such as may be caused when the cylinder is struck by or against an external object or when the cylinder is accidentally upset. The guard of this invention is positioned and is sized so that in the event that the cylinder is accidentally upset or otherwise has a force inflicted on it, the main force will be absorbed by the safety guard and will not be inflicted directly on the valve means.

I am aware that safety guards have been provided by the prior art to protect the valve means. However, the safety guards of the prior art usually consist of some form of a cap which is screwed onto the cylinder so as to envelop the valve means. However, with such a guard, it is impossible to remove gas from the cylinder without first removing the safety guard. Such a guard lacks the inherent utility of my invention wherein the safety guard remains in an effective position even when gas is being withdrawn from or introduced to the cylinder. Furthermore, the guards of the prior art only attempt to protect the valve means from damage and they have no provisions for the safe escape of the gas in the event that damage does occur.

In brief, the safety guard of this invention comprises a deflection means located above the valve means and attached to the cylinder by means of a plurality, i. e. at least two, of suitable supports so as not to interfere with the function and normal use of the valve means.

The deflection means of this invention may be constructed of any suitable material, such as metal, plastic, or the like. The shape of the deflection means should be such as to cause a gas impinging upon it to be deflected in equal amounts in all directions in a single plane. Depending upon the particular design considerations, the shape of the deflection means may be flat and circular, hemispherical, parabolic, or any other shape that will meet the aforementioned desideratum.

A better understanding of the invention may be obtained by reference to the accompanying patent drawing wherein similar figures denote similar parts throughout.

The embodiment now to be described is exemplary of the preferred embodiment of the invention but should not be construed to limit in any way the scope of the invention.

Figure 1:
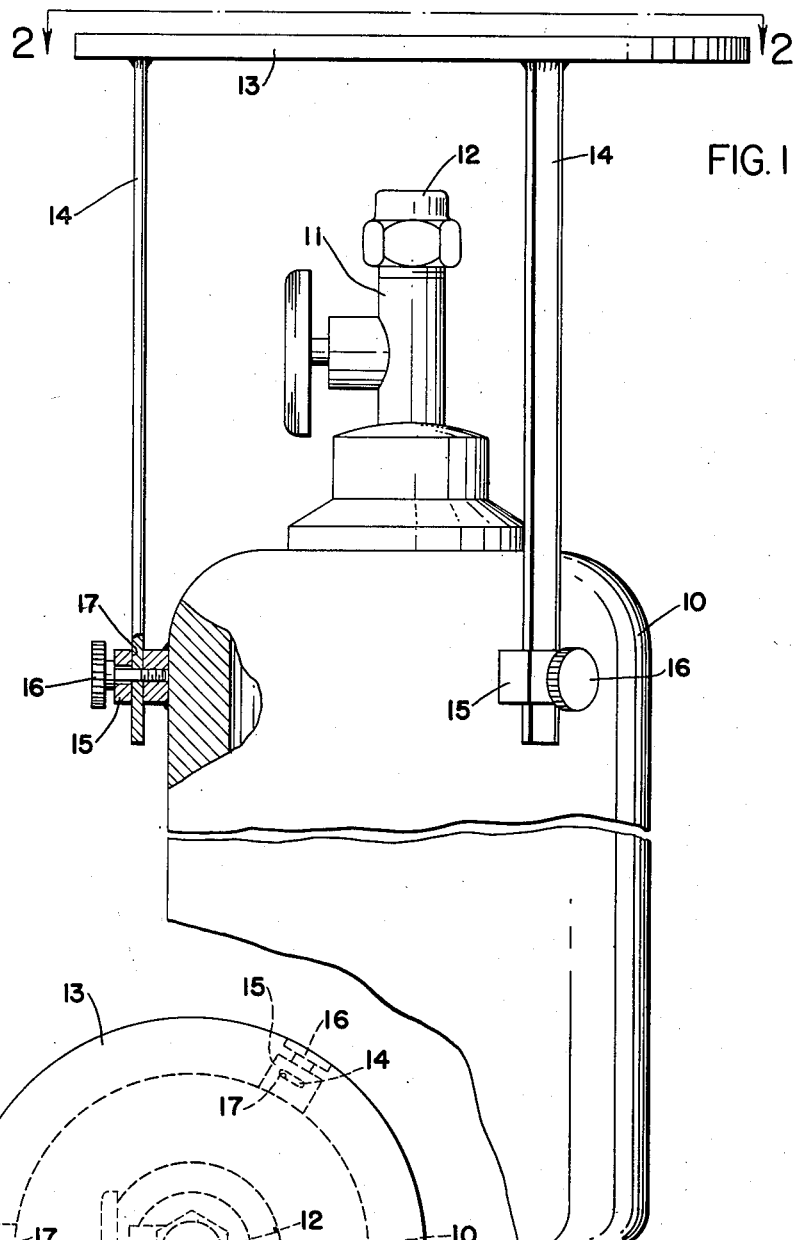
Figure 1 is a side view of the safety guard of this invention attached to a high pressure cylinder in partial cross-section.
Figure 2:
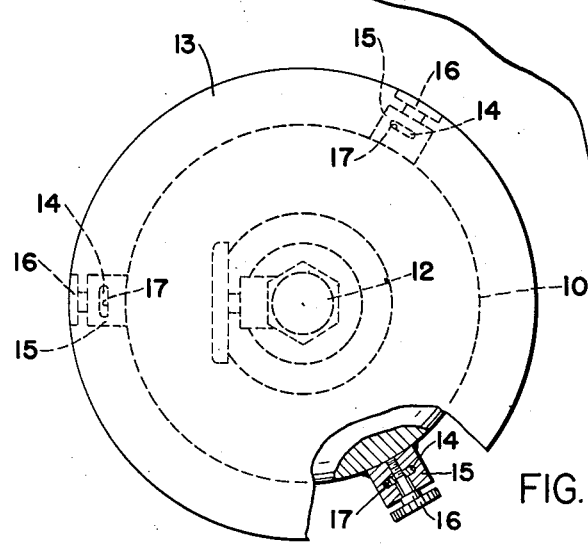
Figure 2 is a top view of the safety guard looking in the direction of the arrows on the plane 2—2 with a cross-sectional view of the means for affixing the safety guard to the cylinder.

Considering now Figures 1 and 2 of the patent drawing, a conventional high pressure cylinder is shown at 10. The cylinder is provided with conventional valve means 11 and a nipple 12 which provides a suitable connection for the introduction and withdrawal of the gas.

The safety guard of this invention comprises a circular deflection plate 13 located above the valve means 11. The plate 13 has a greater diameter than the cylinder 10 and extends beyond the cylinder 10 on all sides as shown in Figure 2. It is this feature that protects the valve means 11 in the event that the cylinder 10 is accidentally upset. The plate 13 is attached to the cylinder 10 by means of the stanchions 14. The stanchions 14 are secured to the plate 13 by any suitable means such as welding. In the illustrated embodiment, the stanchions 14 of the safety guard 13 are not permanently secured to the cylinder 10 but are held in place in the lugs 15 which are provided with a slot 17 to receive the stanchion 14 which is held in place by means of the screws 16. The lugs 15 may be welded to the wall of the cylinder 10. Hence, the safety guard shown in this embodiment may be removed from the cylinder and used in connection with other similar cylinders which have been provided with lugs 15.

A safety guard is thus provided for high pressure cylinders and this application for Letters Patent is intended to cover all modifications of this safety guard which will reasonably fall within the scope of the appended claim.

I claim:

In a combination, a circular deflection plate having a plurality of stanchions attached at equidistant points around the periphery of said plate and perpendicularly thereto, a cylindrical high pressure gas storage container having a diameter less than the diameter of said deflection plate, valve means operably connected at the center of one end of said storage container, a plurality of radially extending lugs of the same number as said stanchions secured permanently to the outer cylindrical wall of said container in a plane adjacent the end having said valve means, said lugs having apertures in a direction parallel to the longitudinal axis of said storage container adapted to receive said stanchions and having threaded openings therein perpendicular to said apertures, said threaded openings having fastening means associated therewith to rigidly secure said stanchions in said lugs whereby said stanchions are secured to said container and said deflection plate attached to said stanchions will be disposed above and opposite to said container and said valve means so that gas accidentally escaping from said container through said valve means will be deflected equally in all directions.

References Cited in the file of this patent

UNITED STATES PATENTS

| | | |
|---|---|---|
| 1,480,574 | Smith | Jan. 15, 1924 |
| 2,339,930 | Howick | Jan. 25, 1944 |